(12) United States Patent
Kudo

(10) Patent No.: US 11,820,237 B2
(45) Date of Patent: Nov. 21, 2023

(54) MOVING BODY INFORMATION TRANSMISSION DEVICE AND MOVING BODY MONITORING SYSTEM USING SAME

(71) Applicant: KOITO ELECTRIC INDUSTRIES, LTD., Shizuoka (JP)

(72) Inventor: Takumichi Kudo, Shizuoka (JP)

(73) Assignee: KOITO ELECTRIC INDUSTRIES, LTD., Shizuoka (JP)

( * ) Notice: Subject to any disclaimer, the term of this patent is extended or adjusted under 35 U.S.C. 154(b) by 728 days.

(21) Appl. No.: 16/979,900

(22) PCT Filed: Mar. 20, 2019

(86) PCT No.: PCT/JP2019/011767
§ 371 (c)(1),
(2) Date: Sep. 11, 2020

(87) PCT Pub. No.: WO2019/188682
PCT Pub. Date: Oct. 3, 2019

(65) Prior Publication Data
US 2021/0008985 A1 Jan. 14, 2021

(30) Foreign Application Priority Data
Mar. 26, 2018 (JP) .................................. 2018-058970

(51) Int. Cl.
*B60L 3/12* (2006.01)
*B61L 25/04* (2006.01)

(52) U.S. Cl.
CPC ................. *B60L 3/12* (2013.01); *B61L 25/04* (2013.01); *B60L 2260/40* (2013.01)

(58) Field of Classification Search
CPC .... B61L 15/0027; B61L 25/025; B61L 25/04; B61L 27/20; B60L 2260/40; B60L 3/12;
(Continued)

(56) References Cited

U.S. PATENT DOCUMENTS

2008/0042815 A1\* 2/2008 Breed .................. G05D 1/0274
340/435
2014/0139354 A1 5/2014 Miyazaki
(Continued)

FOREIGN PATENT DOCUMENTS

CN 106685454 A 5/2017
JP H07-170596 A 7/1995
(Continued)

OTHER PUBLICATIONS

Sep. 29, 2020 International Preliminary Report on Patentability issued in International Patent Application No. PCT/JP2019/011767.
(Continued)

*Primary Examiner* — Hirdepal Singh
(74) *Attorney, Agent, or Firm* — Oliff PLC

(57) ABSTRACT

Information that was collected in time series in a moving body is delivered by wireless communication to a base station in a state in which real-time performance is high and omission of the information is reduced. An information transmission device installed in the moving body includes: a communication section; a position detection section; and a zone information storage section. An operation mode is periodically determined based on the current position and the zone information. When a first operation mode is determined, a predetermined attribute is assigned to new information. When a second operation mode is determined, new information and at least a part of information to which the attribute was assigned are transmitted to the base station. The attribute that had been assigned to the transmitted information among the information to which the attribute was assigned is removed.

20 Claims, 13 Drawing Sheets

(58) Field of Classification Search
CPC ........... B61D 37/00; G08G 1/09; H04M 1/00; H04M 11/00
USPC .......................................................... 340/901
See application file for complete search history.

(56) References Cited

U.S. PATENT DOCUMENTS

2018/0048400 A1\* 2/2018 Kojima .................. H04B 17/10
2020/0302788 A1\* 9/2020 Shibasaki .............. G01C 21/26

FOREIGN PATENT DOCUMENTS

| JP | H08-340308 | A |   | 12/1996 |
|----|------------|---|---|---------|
| JP | 2003-35544 | A |   | 2/2003 |
| JP | 2003-46423 | A |   | 2/2003 |
| JP | 2003-254759 | A |   | 9/2003 |
| JP | 2004-96267 | A |   | 3/2004 |
| JP | 2005-28945 | A |   | 2/2005 |
| JP | 2008-15750 | A |   | 1/2008 |
| JP | 2008015750 | A | \* | 1/2008 |
| JP | 2008-252697 | A |   | 10/2008 |
| JP | 2009-72057 | A |   | 4/2009 |
| JP | 2009-234349 | A |   | 10/2009 |
| JP | 2010-34738 | A |   | 2/2010 |
| JP | 2010-48797 | A |   | 3/2010 |
| JP | 2013-058912 | A |   | 3/2013 |
| JP | 2017-62689 | A |   | 3/2017 |
| JP | 2017-224875 | A |   | 12/2017 |
| WO | 2013/008806 | A1 |   | 1/2013 |

OTHER PUBLICATIONS

Mar. 2022 Office Action issued in Japanese Patent Application No. 2020-214503.
Jan. 4, 2022 Office Action issued in Japanese Patent Application No. 2020-171476.
Dec. 2, 2021 Office Action issued for Chinese Patent Application No. 201980019266.1.
Jun. 25, 2019 International Search Report issued in International Patent Application No. PCT/JP2019/011767.
Nov. 30, 2021 Office Action issued in Japanese Patent Application No. 2020-214503.
Dec. 3, 2021 Office Action issued in Indian Patent Application No. 202017044666.

\* cited by examiner

DETERMINATION PROCESSING BASED ON
COMMUNICATION QUALITY INDEX (S13)

ATTRIBUTE-ASSIGNED INFORMATION
TRANSMISSION PROCESSING (S16)

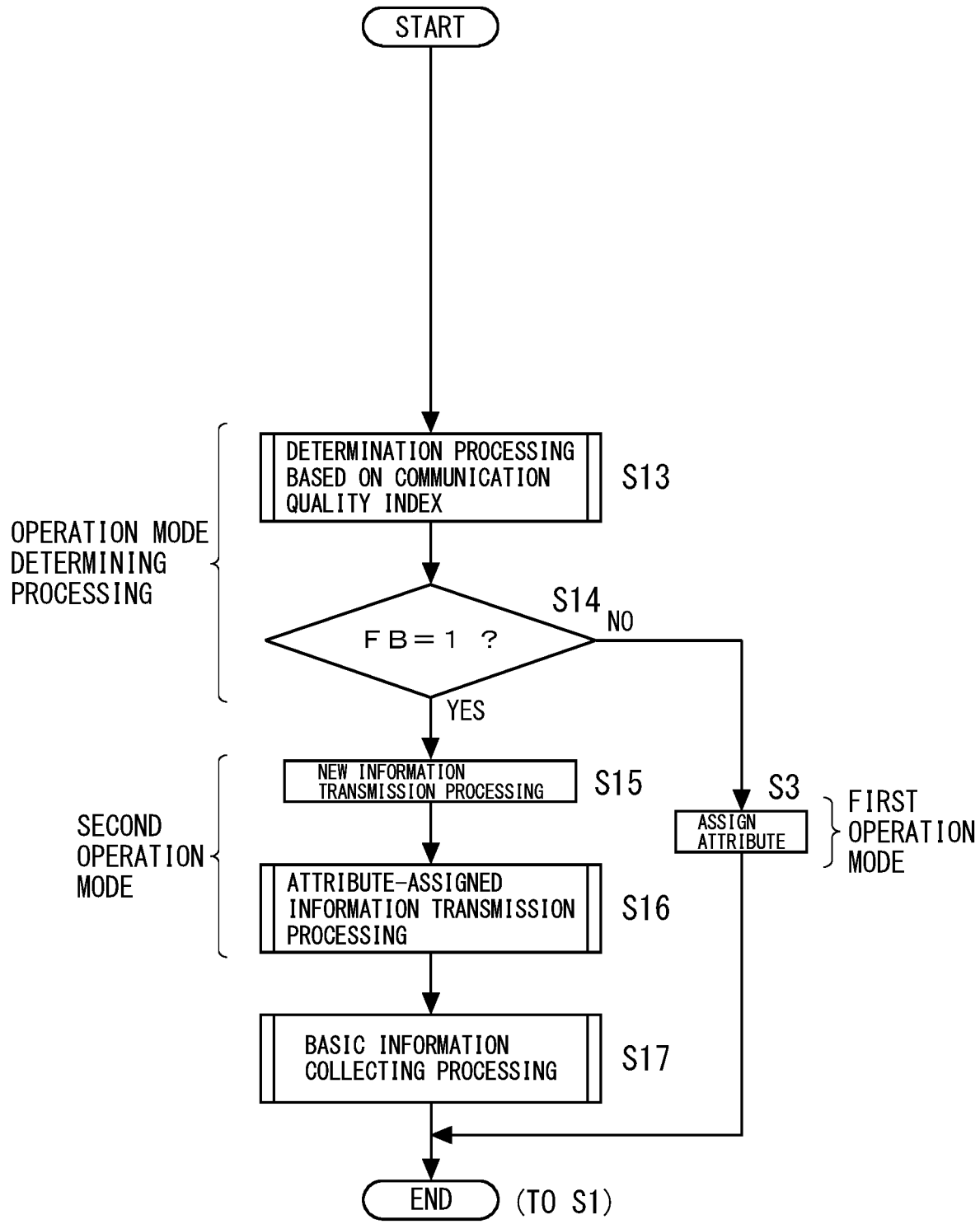

MOVING BODY INFORMATION TRANSMISSION DEVICE AND MOVING BODY MONITORING SYSTEM USING SAME

TECHNICAL FIELD

The present invention relates to an information transmission device in a moving body such as a railway vehicle and a moving body monitoring system using the same.

BACKGROUND ART

In a vehicle state monitoring system disclosed in FIG. 2 of Patent Document 1 described below, states of equipments and devices installed in a railway vehicle are displayed on a vehicle monitoring device that displays the device states of the vehicle and are constantly monitored by a crew. Details of the states of the in-vehicle devices are recorded in a data storage medium, and the record is read from the data storage medium at a garage inspection place or the like after the operation is completed, and the states and statuses of the devices are known. Based on failure information and the like of the devices read from the data storage medium, a parts manufacturer is contacted for inspection and repair, and the repair is performed.

However, in this vehicle state monitoring system of the related art, since only a crew can understand the states of the devices while a railway vehicle is in operation, in the event of device malfunction, the crew has to contact an appropriate department about the malfunction state, ask for a decision, and decide to continue or stop the operation. In addition, since detailed information about the states of the devices can be obtained only after the operation is completed (after entering a garage), a repair work is delayed and, for example, arrangement and the like of replacement parts is delayed.

Considering the above, the vehicle state monitoring system disclosed in FIG. 1 of Patent Document 1 described below includes a vehicle monitoring device which is installed in a railway vehicle and acquires device information of the railway vehicle and positional information of the railway vehicle; an in-vehicle communication device for transmitting failure information of the device of the railway vehicle and the positional information of the railway vehicle acquired by the vehicle monitoring device; and a monitoring center that receives the failure information of the device and the positional information of the railway vehicle from the in-vehicle communication device via a wireless communication network. The monitoring center analyzes the failure information of the device received from the in-vehicle communication device and selects a server to which the failure information and the positional information are transmitted.

According to this vehicle state monitoring system of the related art, the device failure information and the like of the railway vehicle acquired by the vehicle monitoring device are transmitted by the in-vehicle communication device to the monitoring center via the wireless communication network. Therefore, since the device failure information and the like of the railway vehicle can be transmitted to the monitoring center in a state in which real-time performance is high, the monitoring center can quickly grasp the states of the devices installed in the railway vehicle and can promptly deal with the failure of the device.

CITATION LIST

Patent Literature

Patent Document 1: JP-A-2005-28945

SUMMARY OF INVENTION

Technical Problem

However, Patent Document 1 only describes that the in-vehicle communication device transmits the device failure information of the railway vehicle and the positional information of the railway vehicle, and it is unclear how to send these information.

For example, if the vehicle state monitoring system of the related art disclosed in FIG. 1 of Patent Document 1 described below simply transmits the information periodically by the in-vehicle communication device, wireless communication cannot be performed between the in-vehicle communication device and a base station of the wireless communication network when the vehicle is located in a tunnel or in a mountainous area or the like. At that time, the information transmitted from the in-vehicle communication device is not received by the base station and eventually does not reach the monitoring center. Consequently, the information received at the monitoring center has a missing part, and the monitoring center cannot properly monitor the failure and the like of the devices.

This situation applies not only to the failure information but also to other information collected in time series in the vehicle, and applies not only to railway vehicles but also to other moving bodies such as automobiles.

The present invention has been contrived bearing in mind the heretofore described circumstances, and an object of the invention is to provide an information transmission device in a moving body and a moving body monitoring system using the same, which can transmit information collected in time series in the moving body to a base station by wireless communication in a state where real-time performance is high and omission of information is reduced.

Solution to Problem

The following aspects are presented as means for solving the above-mentioned problems. An information transmission device in a moving body according to a first aspect is an information transmission device installed in a moving body, which includes: a communication section that performs wireless communication with a base station on a ground side; a position detection section that detects current position of the moving body; a zone information storage section that stores zone information indicating a predetermined zone that includes a zone in which the wireless communication cannot be performed; an operation mode determining means that periodically determines, based on the current position and the zone information, whether an operation mode relating to transmission from the communication section to the base station is to be a first operation mode or a second operation mode, wherein the operation mode determining means determines the first operation mode when the current position is within the predetermined zone and determines the second operation mode based on a necessary condition that the current position is outside the predetermined zone; an attribute assigning means that, when the operation mode determining means determines the first operation mode, assigns an attribute, indicating that new information should be transmitted later, to the new information that is not yet targeted for processing in the first operation mode or for processing in the second operation mode among information collected in time series in the moving body; a communication control section that, when the operation mode determining means determines the second operation mode, controls the communication section so that the new information, which is not yet targeted for processing in the first operation mode or for processing in the second operation mode among the information collected in time series, and at least a part of the information to which the attribute is assigned are transmitted to the base station; and an attribute canceling means that cancels the attribute, which is assigned to the at least part among the information to which the attribute is assigned, after the transmission of the information.

According to the first aspect, the information collected in time series in the moving body is transmitted by wireless communication to the base station on the ground side by the communication section. Therefore, according to the first aspect, unlike the vehicle state monitoring system of the related art disclosed in FIG. 2 of Patent Document 1, the information collected in time series in the moving body can be delivered to the base station on the ground side (in turn, a desired destination such as a server of a monitoring center connected to the base station via a network) in a state in which real-time performance is high, like the vehicle state monitoring system of the related art disclosed in FIG. 1 of Patent Document 1.

According to the first aspect, which of the first operation mode and the second operation mode is to be determined is periodically determined based on the current position and the zone information. When the current position is within the predetermined zone, the operation mode is determined to be the first operation mode. The operation mode is determined to be the second operation mode based on a necessary condition that the current position is outside the predetermined zone. When the operation mode is determined to be the first operation mode, the attribute, indicating that new information should be transmitted later, is assigned to the new information that has not yet been targeted for processing in the first operation mode or for processing in the second operation mode among the information collected in time series in the moving body. When the operation mode is determined to be the second operation mode, the new information, which has not yet been targeted for processing in the first operation mode or for processing in the second operation mode among the information collected in time series, and at least a part of the information to which the attribute is assigned are transmitted to the base station.

Thus, according to the first aspect, basically, when the current position of the moving body is within the predetermined zone, the attribute is assigned to the new information at that time. Basically, when the current position of the moving body is outside the predetermined zone, the new information at that time and the information to which the attribute is assigned are transmitted. Thus, most of such situations are prevented that the transmission is performed even though the wireless communication cannot be actually performed and even retransmission is not performed by assuming that the transmission was completed properly. As a result, the information collected in time series in the moving body can be delivered to the base station by the wireless communication in a state where the omission of information is reduced. Not only that, according to the first aspect, basically, when the current position of the moving body is outside the predetermined zone, at least the new information at that time is transmitted. Thus, since new information having relatively high value is sent in preference to old information having relatively low value, the information collected in time series in the moving body can be delivered to the base station by the wireless communication in a state in which real-time performance is higher.

An information transmission device in a moving body according to a second aspect is arranged in a manner that, in the first aspect, the operation mode determining means determines the first operation mode when predicted future position of the moving body after lapse of a predetermined time from current time is within the predetermined zone.

According to the second aspect, such a situation can be prevented that, in the case where the moving body is located on the near side of a zone in which the wireless communication cannot be performed (hereinafter referred to as "non-communicable zone") but located close to the zone, the moving body will enter the non-communicable zone at the time of actual transmission and the wireless communication will not be able to be performed. As a result, it is possible to further reduce the omission of information to be delivered.

An information transmission device in a moving body according to a third aspect is arranged in a manner that, in the first or second aspect, the predetermined zone includes a zone in which the wireless communication can be performed, which is located in a traveling direction of the moving body on a near side of the zone where the wireless communication cannot be performed, and which has a predetermined distance in the traveling direction. According to the third aspect, such a situation can be prevented that, in the case where the moving body is located on the near side of the non-communicable zone but located close to the zone, the moving body will enter the non-communicable zone at the time of actual transmission and the wireless communication will not be able to be performed. As a result, it is possible to further reduce the omission of information to be delivered.

An information transmission device in a moving body according to a fourth aspect is arranged in a manner that, in any one of the first to third aspects, the communication control section controls the communication section so that the information is not transmitted when the operation mode determining means determines the first operation mode.

According to the fourth aspect, it is often possible to avoid a useless transmission operation by the communication section. However, in the first to third aspects, the information may be transmitted even when the operation mode determining means determines the first operation mode.

An information transmission device in a moving body according to a fifth aspect is arranged in a manner that, in any one of the first to fourth aspects, an index acquisition means that acquires an index indicating current quality of the wireless communication is provided, wherein the operation mode determining means determines the second operation mode based on a necessary condition that the index indicates that the quality is equal to or higher than predetermined quality.

According to the fifth aspect, the operation mode is determined to be the second operation mode based on the necessary condition that the index indicates that the quality is equal to or higher than the predetermined quality, and to be the first operation mode when the index indicates that the quality is lower than the predetermined quality. As a result, it is possible to further reduce the omission of information to be delivered.

An information transmission device in a moving body according to a sixth aspect is arranged in a manner that, in the fifth aspect, the index is based on at least one of RSSI, SNR, noise strength, or CQI.

The sixth aspect raises specific examples of the index. However, in the fifth aspect, the index is not limited to these specific examples.

An information transmission device in a moving body according to a seventh aspect is arranged in a manner that, in any one of the first to sixth aspects, a basic information collecting means that collects basic information for generating or updating the zone information is provided.

According to the seventh aspect, since the basic information collecting means is provided, the basic information can be easily collected. Moreover, since the basic information can be collected by the moving boy that is actually moving, the accuracy of the zone information can be increased by generating or updating the zone information based on the basic information.

An information transmission device in a moving body according to an eighth aspect is arranged in a manner that, in the seventh aspect, the basic information collecting means periodically collects, as at least a part of the basic information, an index indicating current quality of the wireless communication or a determination result of whether or not the index indicates that the quality is equal to or higher than a predetermined quality, and the current position of the moving body, in association with each other.

The eighth aspect raises an example of the basic information. However, in the seventh aspect, the basic information is not limited to this example, and may include, for example, the time when the index or the determination result and the current position are collected.

An information transmission device in a moving body according to a ninth aspect is an information transmission device installed in a moving body, which includes: a communication section that performs wireless communication with a base station on a ground side; an index acquisition means that acquires an index indicating current quality of the wireless communication; an operation mode determining means that periodically determines, based on the index, whether an operation mode relating to transmission from the communication section to the base station is to be a first operation mode or a second operation mode, wherein the operation mode determining means determines the first operation mode when the index indicates that the quality is lower than predetermined quality and determines the second operation mode when the index indicates that the quality is equal to or higher than the predetermined quality; an attribute assigning means that, when the operation mode determining means determines the first operation mode, assigns an attribute, indicating that new information should be transmitted later, to the new information that is not yet targeted for processing in the first operation mode or for processing in the second operation mode among information collected in time series in the moving body; a communication control section that, when the operation mode determining means determines the second operation mode, controls the communication section so that the new information, which is not yet targeted for processing in the first operation mode or for processing in the second operation mode among the information collected in time series, and at least a part of the information to which the attribute is assigned are transmitted to the base station; and an attribute canceling means that cancels the attribute, which is assigned to the at least part among the information to which the attribute is assigned, after the transmission of the information.

According to the ninth aspect, the information collected in time series in the moving body is transmitted to the base station on the ground side by wireless communication by the communication section. Thus, according to the ninth aspect, unlike the vehicle state monitoring system of the related art disclosed in FIG. 2 of Patent Document 1, the information collected in time series in the moving body can be delivered to the base station on the ground side (in turn, a desired destination such as a server of a monitoring center connected to the base station via a network) in a state in which real-time performance is high, like the vehicle state monitoring system of the related art disclosed in FIG. 1 of Patent Document 1.

According to the ninth aspect, which of the first operation mode and the second operation mode is to be determined is periodically determined based on the index indicating the current quality of the wireless communication. When the index indicates that the quality is lower than the predetermined quality, the operation mode is determined to be the first operation mode. When the index indicates that the quality is equal to or higher than the predetermined quality, the operation mode is determined to be the second operation mode. When the operation mode is determined to be the first operation mode, the attribute, indicating that new information should be transmitted later, is assigned to the new information that has not yet been targeted for processing in the first operation mode or for processing in the second operation mode among the information collected in time series in the moving body. When the operation mode is determined to be the second operation mode, the new information, which has not yet been targeted for processing in the first operation mode or for processing in the second operation mode among the information collected in time series, and at least a part of the information to which the attribute is assigned are transmitted to the base station.

Thus, according to the ninth aspect, basically, when the wireless communication cannot be performed, the attribute is assigned to the new information at that time. Basically, when the wireless communication can be performed, the new information at that time and the attribute-assigned information are transmitted. Thus, most of such situations are prevented that the transmission is performed even though the wireless communication cannot be actually performed and even retransmission is not performed by assuming that the transmission was completed properly. As a result, the information collected in time series in the moving body can be delivered to the base station by the wireless communication in a state where the omission of information is reduced. Not only that, according to the ninth aspect, basically, when the wireless communication can be performed, at least the new information at that time is transmitted. Thus, since new information having relatively high value is sent in preference to old information having relatively low value, the information collected in time series in the moving body can be delivered to the base station by the wireless communication in a state in which real-time performance is higher.

An information transmission device in a moving body according to a tenth aspect is arranged in a manner that, in the ninth aspect, the index is based on at least one of RSSI, SNR, noise strength, or CQI.

The tenth aspect raises specific examples of the index. However, in the ninth aspect, the index is not limited to these specific examples.

An information transmission device in a moving body according to a eleventh aspect is arranged in a manner that, in the ninth or tenth aspect, when the operation mode determining means determines the first operation mode, the attribute assigning means assigns the attribute not only to the new information that is not yet targeted for processing in the first operation mode or for processing in the second operation mode among the information collected in time series but also to information collected from N times before to one time before the new information among the information collected in time series, where N is an integer of 1 or more.

According to the eleventh aspect, even when such a situation occurs that, in the case where the moving body is located on the near side of the non-communicable zone but close to the zone, the moving body has entered the non-communicable zone at the time of actual transmission and cannot perform the wireless communication, the information that could not be transmitted at that time (the information collected from N times before to one time before) will be retransmitted. As a result, it is possible to further reduce the omission of information to be delivered.

An information transmission device in a moving body according to a twelfth aspect is arranged in a manner that, in any one of the ninth to eleventh aspects, the communication control section controls the communication section so that the information is not transmitted when the operation mode determining means determines the first operation mode.

According to the twelfth aspect, it is often possible to avoid a useless transmission operation by the communication section. However, in the ninth to eleventh aspects, the information may be transmitted even when the operation mode determining means determines the first operation mode.

An information transmission device in a moving body according to a thirteenth aspect is arranged in a manner that, in any one of the first to twelfth aspects, a storage section that primarily stores the information collected in time series is provided, wherein information transmitted when the operation mode determining means determines the second operation mode, among the information collected in time series, is deleted from the storage section.

According to the thirteenth aspect, the storage capacity of the storage section that stores the information collected in time series can be small.

An information transmission device in a moving body according to a fourteenth aspect is arranged in a manner that, in any one of the first to twelfth aspects, a storage section is provided, wherein the storage section readably stores and retains the information collected in time series regardless of whether the information was transmitted or not.

According to the fourteenth aspect, since the information collected in time series is entirely stored in the storage section, a failure state and the like of the moving body can be analyzed in detail, for example, by reading the information at a base or the like of the moving body.

An information transmission device in a moving body according to a fifteenth aspect is arranged in a manner that, in any one of the first to fourteenth aspects, the moving body is a railway vehicle.

The fifteenth aspect raises a specific example of the moving body. However, in the first to fourteenth aspects, the moving body is not limited to a railway vehicle, and may be another moving body such as an automobile.

A moving body monitoring system according to a sixteenth aspect includes: the information transmission device in the moving body according to any one of the first to fifteenth aspects; and a server of a monitoring center that receives, via a network including the base station, the information transmitted by the information transmission device.

According to the sixteenth aspect, since the information collected in time series in the moving body can be transmitted to the server of the monitoring center in a state where real-time performance is high and omission of information is reduced, the monitoring center can quickly grasp the state of the moving body and promptly take the countermeasure according to the state.

Advantageous Effects of Invention

According to the present invention, it is possible to provide an information transmission device in a moving body and a moving body monitoring system using the same, which can transmit information collected in time series in the moving body to a base station by wireless communication in a state where real-time performance is high and omission of information is reduced.

BRIEF DESCRIPTION OF DRAWINGS

FIG. 14 A schematic flowchart showing details of the periodic processing in FIG. 4 in an information transmission device of a moving body monitoring system according to a fifth embodiment of the present invention.

DESCRIPTION OF EMBODIMENTS

Hereinafter, an information transmission device in a moving body and a moving body monitoring system using the same according to the present invention will be described with reference to the drawings.

First Embodiment

Figure 1:
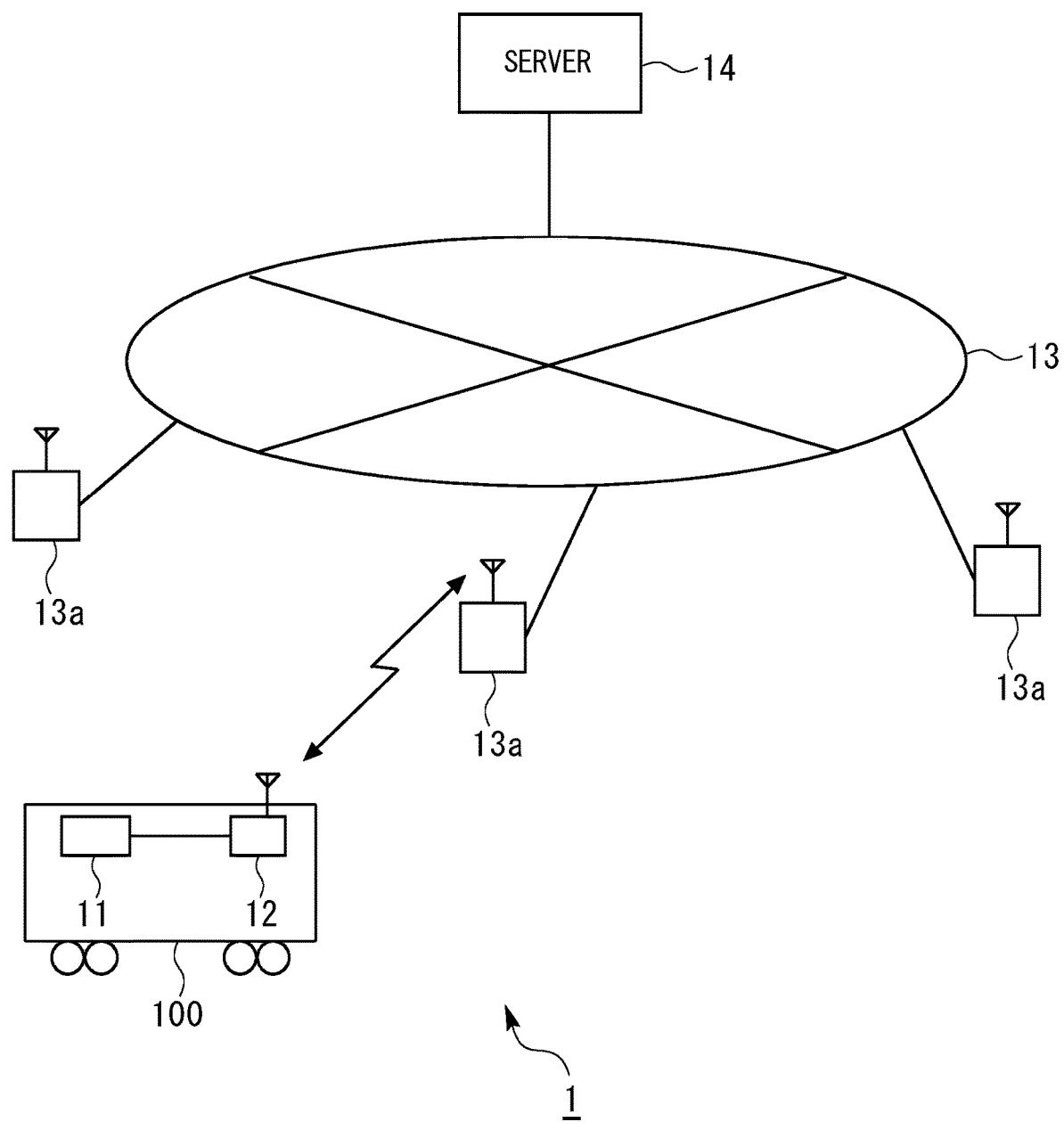
FIG. 1 A schematic configuration diagram showing a moving body monitoring system according to a first embodiment of the present invention.
Figure 2:
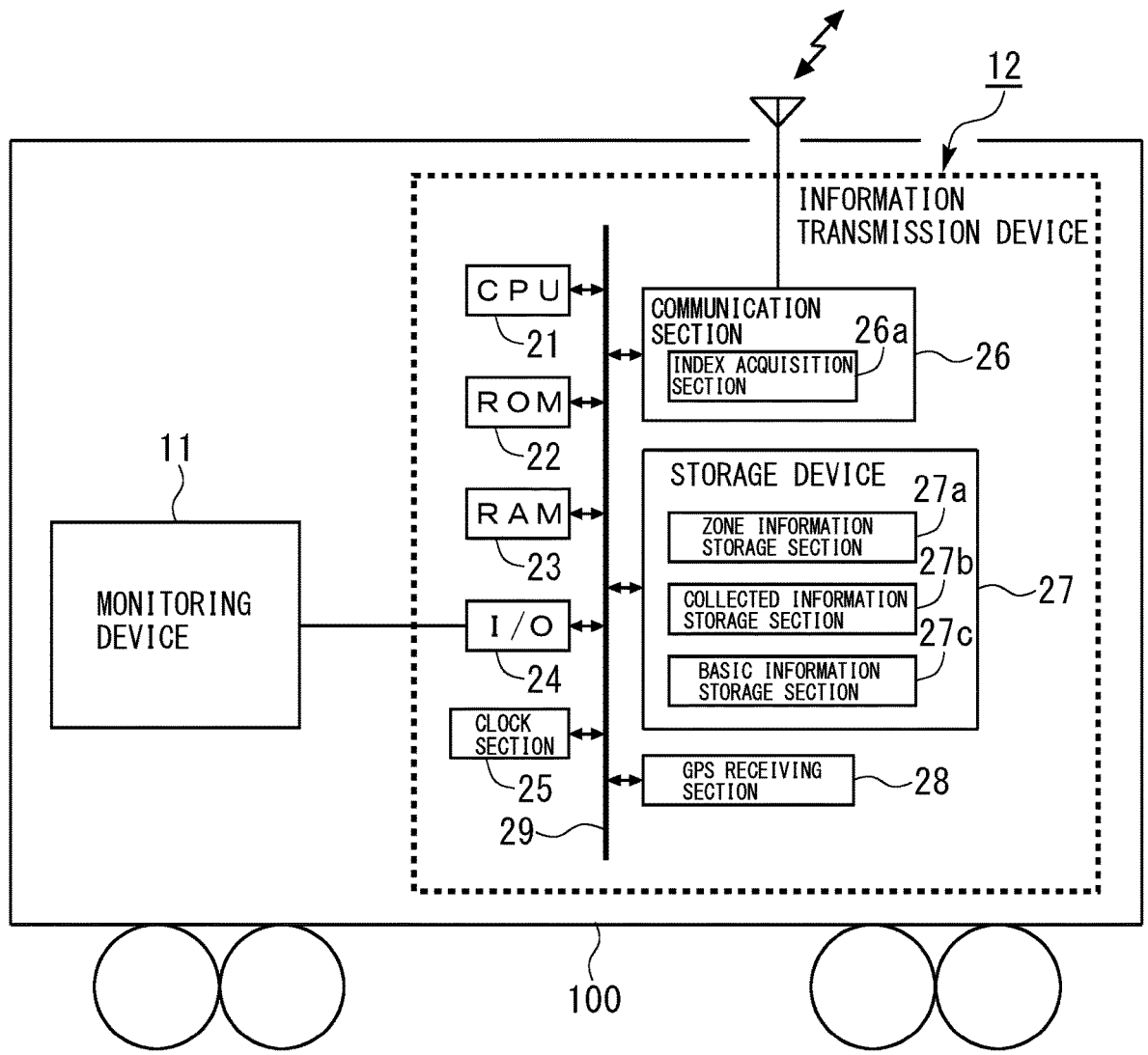
FIG. 2 A schematic configuration diagram showing a railway vehicle as a moving body in FIG. 1, a monitoring device and an information transmission device installed in the railway vehicle.

FIG. 1 is a schematic configuration diagram showing a moving body monitoring system 1 according to a first embodiment of the present invention. FIG. 2 is a schematic configuration diagram showing a railway vehicle 100 as a moving body in FIG. 1, a monitoring device 11 and an information transmission device 12 installed in the railway vehicle.

The moving body monitoring system 1 according to the present embodiment includes the information transmission device 12 that is installed in the railway vehicle 100 and transmits information, which is collected in time series in the railway vehicle 100 by the monitoring device 11 installed in the railway vehicle 100 as a moving body, to a base station 13a on a ground side by wireless communication, and further includes a server 14 of a monitoring center that receives the information transmitted by the information transmission device 12 via a network 13 including a mobile communication network containing the base station. The information transmission device 12 is an information transmission device in a moving body according to the embodiment of the present invention.

The mobile communication network may be provided by a mobile communication carrier, or may be, for example, a communication network dedicated to a railway system. The network 13 may include the Internet, a public switched telephone network (PSTN), a packet switched network (PSN), an ISDN (integrated services digital network), and the like.

Examples of the information that the monitoring device 11 collects in time series in the railway vehicle 100 include states of various equipments and devices installed in the railway vehicle 100, detection information from various sensors, various information due to operation of a crew (for example, information indicating lack of fixtures, etc.), speed of the railway vehicle 100, and a distance from the starting point to the position of the railway vehicle 100 (for example, a distance detected based on the rotation number of the wheel while being corrected at a station, a ground coil, or the like) or the like. The monitoring device 11 has a function of displaying the states of the devices and the like based on the collected information and presenting it to a crew such as a driver.

In the present embodiment, the information transmission device 12 includes a CPU 21, a ROM 22, a RAM 23, an input/output interface 24 to which the monitoring device 11 is connected to receive the information collected by the monitoring device 11 and to which a not-shown external device and the like are connected, a clock section 25 that has a clocking function (timing function) and outputs current time information, a communication section 26 that performs wireless communication by radio waves with the base station 13a, a storage device 27 such as a hard disk or SSD, a GPS receiving section 28 as a position detection section that detects the current position of the railway vehicle 100, and a bus 29 that connects these constituent elements to each other. In the embodiment, when the GPS receiving section 28 cannot receive a GPS signal in a tunnel or the like, a distance from the starting point obtained from the monitoring device 11 is used as the current position of the railway vehicle 100.

In the present embodiment, the communication section 26 has a function as an index acquisition section 26a that acquires an index indicating the current quality of wireless communication between the communication section 26 and the base station 13a. For example, the index may be based on at least one of RSSI (received signal strength indication), SNR (signal to noise ratio), noise strength, or CQI (channel quality indication).

For example, when the communication section 26 can acquire RSSI but cannot acquire noise intensity as the function of the index acquisition section 26a, the CPU 21 determines that, when the RSSI value obtained from the communication section 26 is equal to or larger than a predetermined value (for example, −73 dB) or more, the index indicates that the quality is equal to or higher than predetermined quality and determines that the wireless communication can be performed. When the RSSI value is smaller than the predetermined value, the CPU 21 determines that the index indicates that the quality is lower than the predetermined quality and determines that the wireless communication cannot be performed. For example, when the communication section 26 can acquire both RSSI and noise intensity as the function of the index acquisition section 26a, the CPU 21 determines that, when a first condition that the value of RSSI is the predetermined value (for example, −73 dB) or more is satisfied and a second condition that SNR calculated by an expression SNR (dB) =RSSI (dBm)—noise intensity (dBm) is a predetermined value (for example, 25 dbm) or more is satisfied, the index indicates that the quality is equal to or higher than the predetermined quality and determines that the wireless communication can be performed. When either of the first and second conditions is not satisfied, the CPU 21 determines that the index indicates that the quality is lower than the predetermined quality and determines that the wireless communication cannot be performed.

In the present embodiment, the information transmission device 12 includes a zone information storage section 27a that stores zone information indicating a predetermined zone 203 which includes a zone (non-communicable zone) 201 in which wireless communication between the communication section 26 and the base station 13a cannot be performed. In the present embodiment, the zone information storage section 27a is a partial storage area of the storage device 27, but is not limited to this. For example, when the railway vehicle 100 returns to a base, by connecting a personal computer or the like to the input/output interface 24, the zone information can be newly stored in the zone information storage section 27a and the zone information can be updated in the zone information storage section 27a by the personal computer or the like.

Figure 3:
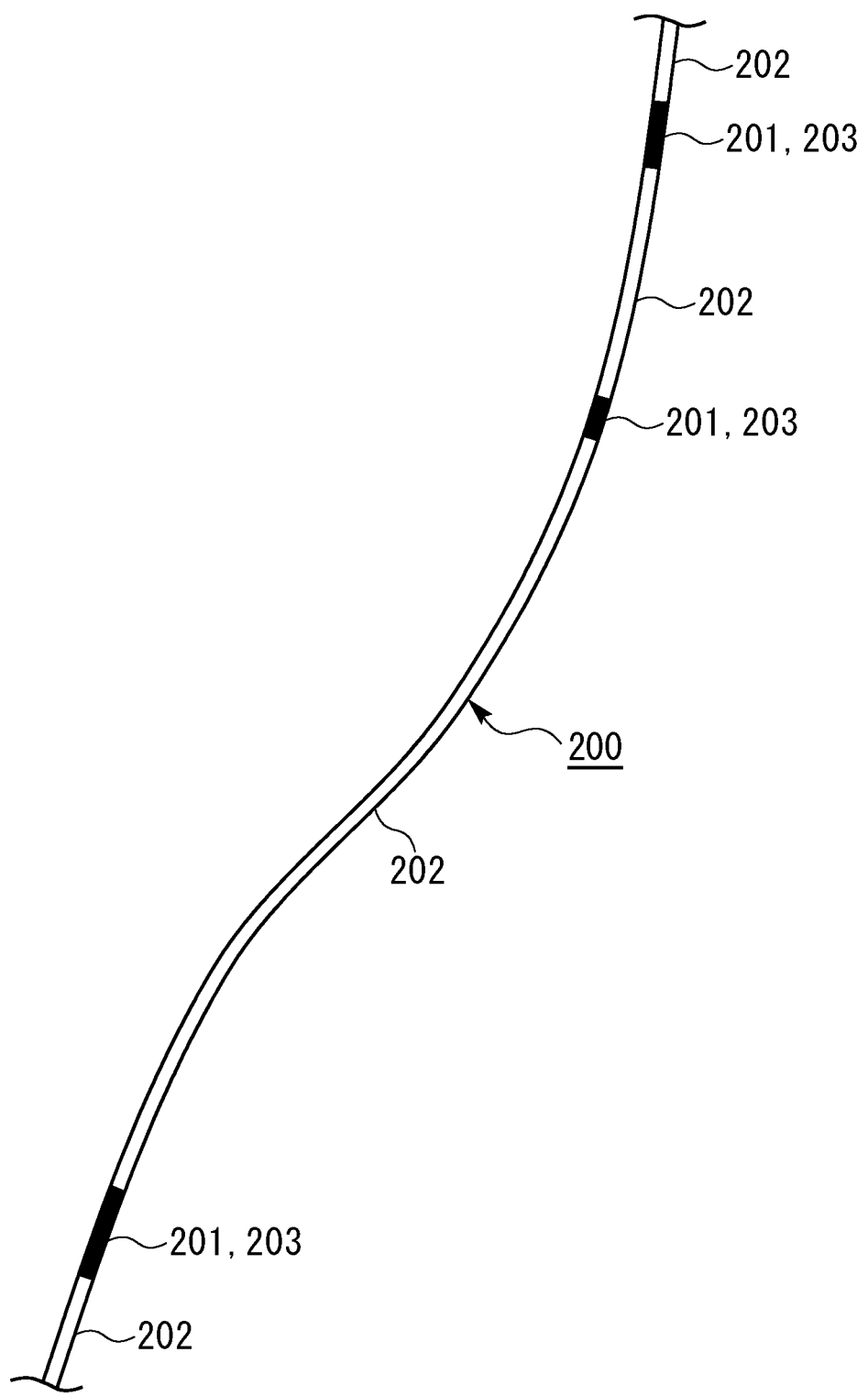
FIG. 3 An explanatory diagram schematically showing an example of a predetermined zone, which is indicated by zone information used in the information transmission device of the moving body monitoring system according to the first embodiment of the present invention, in association with a non-communicable zone and a communicable zone in a part of a moving route of a railway vehicle on a map.

FIG. 3 is an explanatory diagram schematically showing an example of the predetermined zone 203, which is indicated by the zone information used in the information transmission device 12 of the moving body monitoring system 1 according to the present embodiment, in association with the non-communicable zone 201 and a communicable zone (zone where wireless communication can be performed between the communication section 26 and the base station 13a) 202 in a part of a moving route 200 of a railway vehicle on a map. In the movement route 200 in FIG. 3, a black portion indicates the non-communicable zone 201, and a white portion indicates the communicable zone 202. In the present embodiment, the predetermined zone 203 is set to be the same as the non-communicable zone 201, but the present invention is not limited to this.

The zone information indicating the predetermined zone 203 may be information directly indicating the predetermined zone 203 or may be information directly indicating a zone other than the predetermined zone 203. In the latter case, the zone other than the predetermined zone 203 indirectly indicates the predetermined zone by the other zone.

For example, the non-communicable zone 201 may be set as a known zone such as a tunnel zone or a zone far from the base station 13a, may be determined based on basic information that the railway vehicle 100 itself or another vehicle such as the same type traveled and acquired in the past in step S17 in FIG. 5 described later, may be determined based on basic information obtained by actual measurement by a method similar to step S17 in FIG. 5 described later, may be determined based on a position of the railway vehicle 100 that is missing without reaching the server 14 when the railway vehicle 100 actually travels and the current position of the railway vehicle 100 is periodically transmitted from the communication section 26 to the server 14 in association with the current time, or may be determined or updated by using one or more of these methods in combination.

In the present embodiment, the information transmission device 12 includes a collected information storage section 27b that stores information collected by the monitoring device 11 in the railway vehicle 100 in time series, and a basic information storage section 27c that stores the basic information, for generating or updating the zone information, which is collected in step S17 in FIG. 5 described later. In the present embodiment, the collected information storage section 27b and the basic information storage section 27c are partial storage areas of the storage device 27, but the present invention is not limited to this.

Figure 4:
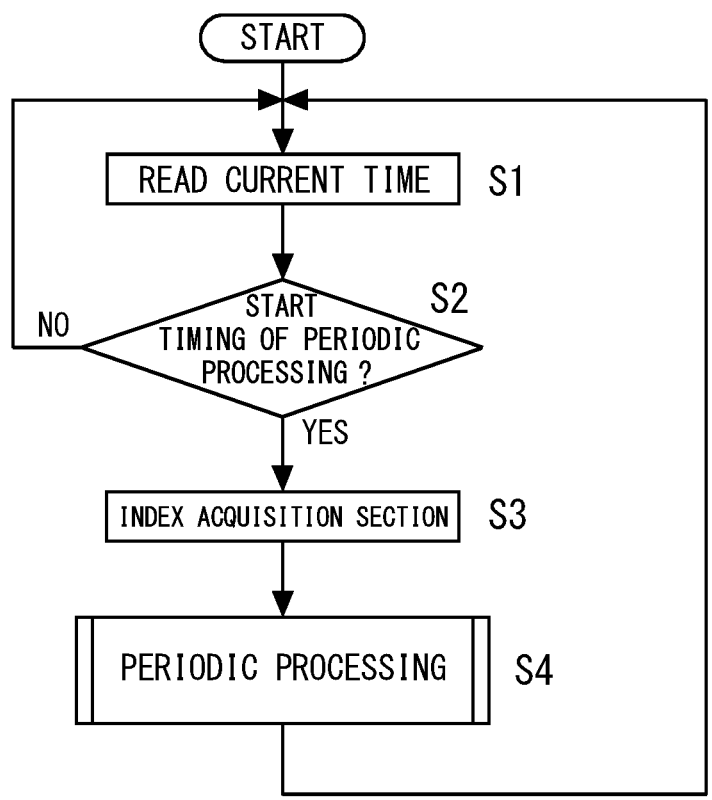
FIG. 4 A schematic flowchart showing an example of an operation of the information transmission device shown in FIGS. 1 and 2.

FIG. 4 is a schematic flowchart showing an example of the operation of the information transmission device 12 shown in FIGS. 1 and 2.

When the information transmission device 12 starts to operate, the CPU 21 of the information transmission device 12 reads the current time at that time from the clock section 25 (step S1), and determines whether or not the current time is the start timing (start timing every predetermined time (for example, 1 second)) of a periodic processing (step S2).

When it is determined in step S2 that the current time is not the start timing of the periodic processing, the process returns to step S1 and waits until the current time becomes the start timing of the periodic processing. On the other hand, when it is determined in step S2 that the current time is the start timing of the periodic processing, the process proceeds to step S3.

In step S3, the CPU 21 receives new information, which has been collected in time series by the monitoring device 11 but not yet received from the monitoring device 11, from the monitoring device 11 and stores the information in the collected information storage section 27b. In the present embodiment, the time interval of the information collection timing by the monitoring device 11 and the time interval of the start timing of the periodic processing are the same (for example, 1 second). As a result, in the present embodiment, the information received from the monitoring device 11 in step S3 is only the latest information collected by the monitoring device 11. However, the time intervals of both timings do not necessarily have to match. For example, the time interval of the start timing of the periodic processing may be twice the time interval of the information collection timing of the monitoring device 11. In this case, the information received from the monitoring device 11 in step S3 is the latest information collected by the monitoring device 11 and the information collected one time before the latest information.

The information collected in time series by the monitoring device 11 and stored in the collected information storage section 27b in step S3 is retained in the collected information storage section 27b as it is without being deleted even after steps S15 and S16 described later. For example, when the railway vehicle 100 returns to the base, by connecting a personal computer or the like to the input/output interface 24, the retained information can be read from the collected information storage section 27b by the personal computer or the like.

Subsequently, after the periodic processing (step S4) is performed, the process returns to step S1.

Figure 5:
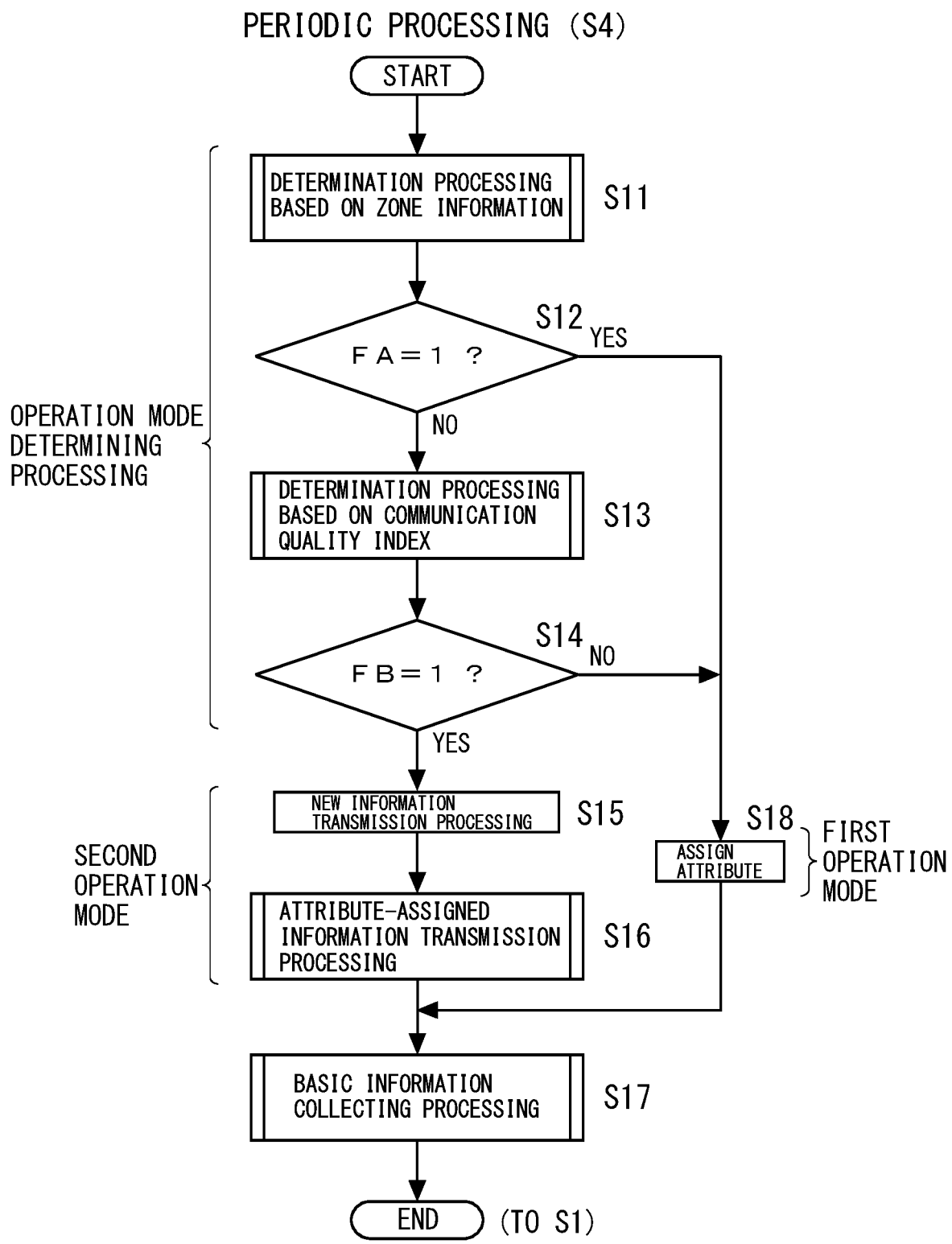
FIG. 5 A schematic flowchart showing details of a periodic processing in FIG. 4.

FIG. 5 is a schematic flowchart showing details of the periodic processing (step S4) in FIG. 4.

Figure 6:
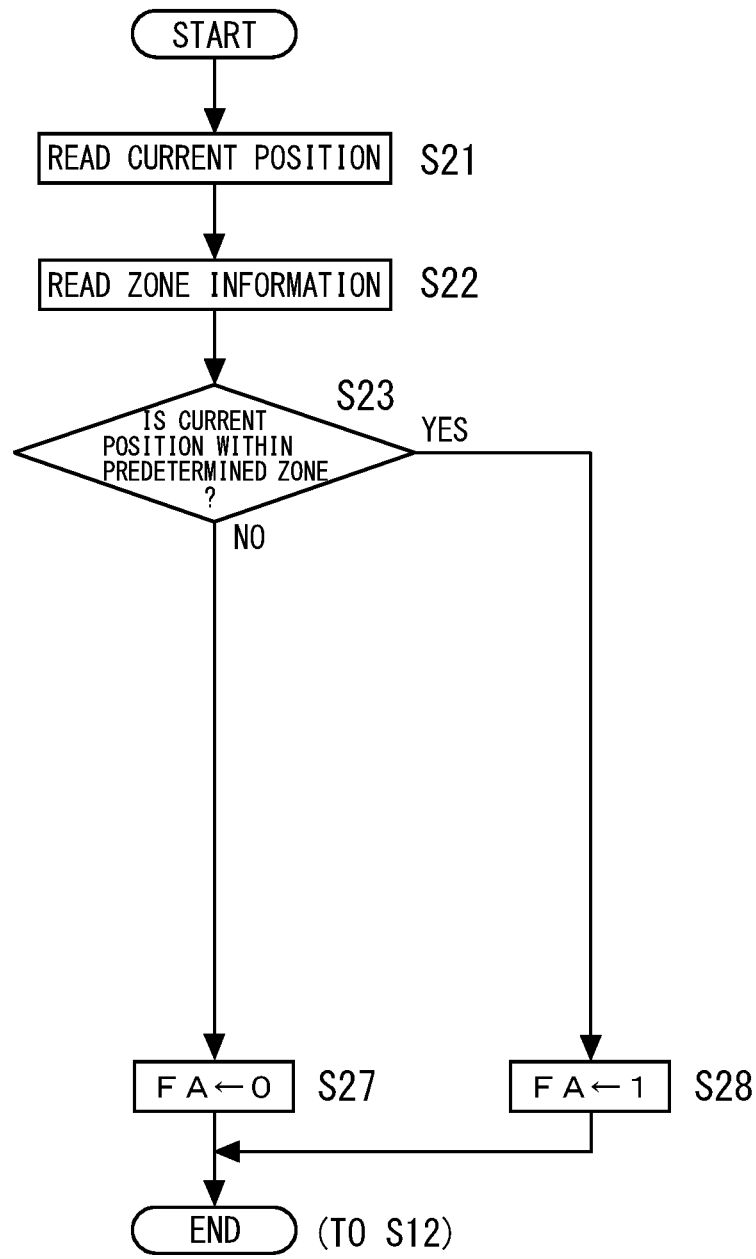
FIG. 6 A schematic flowchart showing details of a determination processing based on zone information in FIG. 5.

When the periodic processing (step S4) is started, the CPU 21 first performs a determination processing (step S11) based on the zone information. FIG. 6 is a schematic flowchart showing details of the determination processing (step S11) based on the zone information in FIG. 5.

When the determination processing (step S11) based on the zone information is started, the CPU 21 first reads the current position of the railway vehicle 100 at that time from the GPS receiving section 28 (step S21). At this time, when the GPS receiving section 28 cannot receive the GPS signal, the CPU 21 reads, from the monitoring device 11, the distance from the starting point as the current position of the railway vehicle 100.

Next, the CPU 21 reads the zone information from the zone information storage section 27a (step S22).

Subsequently, the CPU 21 determines whether or not the current position read in step S21 is within the predetermined zone 203 indicated by the zone information read in step S22 (step S23).

When it is determined in step S23 that the current position is within the predetermined zone 203, the CPU 21 sets a determination result flag FA to 1 (step S28), ends the determination processing based on the zone information (step S11), and proceeds to step S12 in FIG. 5. On the other hand, when it is determined in step S23 that the current position is not within the predetermined zone 203 (that is, outside the predetermined zone 203), the CPU sets the determination result flag FA to 0 (step S27), ends the determination processing (step S11) based on the zone information, and proceeds to step S12 in FIG. 5.

In step S12, the CPU 21 determines whether or not the determination result flag FA is 1. When it is determined that the determination result flag FA is 1, the process proceeds to step S18. On the other hand, when it is determined that the determination result flag FA is not 1 (that is, 0), the process proceeds to step S13.

Figure 7:
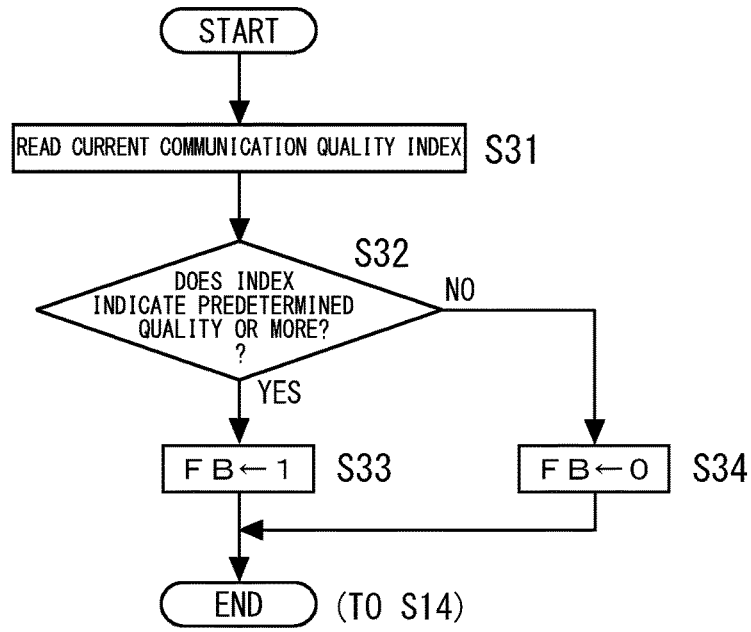
FIG. 7 A schematic flowchart showing details of a determination processing based on a communication quality index in FIG. 5.

In step S13, the CPU 21 performs determination processing based on a communication quality index. FIG. 7 is a schematic flowchart showing details of the determination processing (step S13) based on the communication quality index in FIG. 5.

When the determination processing (step S13) based on the communication quality index is started, the CPU 21 first reads an index indicating the current quality of the wireless communication at that time from the communication section 26 that functions as the index acquisition section 26a (step S31), and determines whether or not the index indicates that the current quality is equal to or higher than the predetermined quality by the method as described above (step S32).

When it is determined in step S32 that the current index indicates that the quality is equal to or higher than the predetermined quality (that is, the wireless communication can be performed between the communication section 26 and the base station 13a), the CPU 21 sets a determination result flag FB to 1 (step S33), ends the determination processing (step S13) based on the communication quality index, and proceeds to step S14 in FIG. 5. On the other hand, when it is determined in step S32 that the current index indicates that the quality is not equal to or higher than the predetermined quality (that is, the wireless communication cannot be performed between the communication section 26 and the base station 13a), the CPU 21 sets the determination result flag FB to 0 (step S34), ends the determination processing (step S13) based on the communication quality index, and proceeds to step S14 in FIG. 5.

In step S14, the CPU 21 determines whether or not the determination result flag FB is 1. When it is determined that the determination result flag FB is not 1 (that is, 0), the process proceeds to step S18. On the other hand, when it is determined that the determination result flag FB is 1, the process proceeds to step S15.

In step S18, the CPU 21 assigns an attribute, indicating that information should be transmitted later, to the information read in the immediately preceding step S3 (new information that has not yet been targeted for processing in step S18 or for processing in step S15 or later among the information collected by the monitoring device 11 in time series in the railway vehicle 100). In the present embodiment, in order to transmit the information later as packets, the CPU 21 generates a plurality of packets from the information, and stores the plurality of packets in a predetermined storage area (referred to as "attribute-assigned information storage area") in the RAM 23, thereby assigning the attribute. The packets stored in the attribute-assigned information storage area in the RAM 23 are queued to be transmitted later in step S16 described later. At this time, in the present embodiment, the information read in step S3 and stored in the collected information storage section 27b is retained in the collected information storage section 27b as it is without being deleted. The format of assigning the attribute to information is not limited to storing the information as packets in the attribute-assigned information storage area in the RAM 23, and the attribute may be assigned, for example, by associating the information stored in the collected information storage section 27b with attribute data indicating that the information should be transmitted later.

After step S18, the process proceeds to step S17.

In step S15, the CPU 21 performs a process of transmitting the new information. In the present embodiment, in step S15, in order to transmit the information read in the immediately preceding step S3 (the new information that has not yet been targeted for processing in step S18 or for processing in step S15 or later among the information collected by the monitoring device 11 in time series in the railway vehicle 100) as packets, the CPU 21 generates a plurality of packets from the information and controls the communication section 26 so that these packets are sequentially transmitted at predetermined time intervals.

Figure 8:
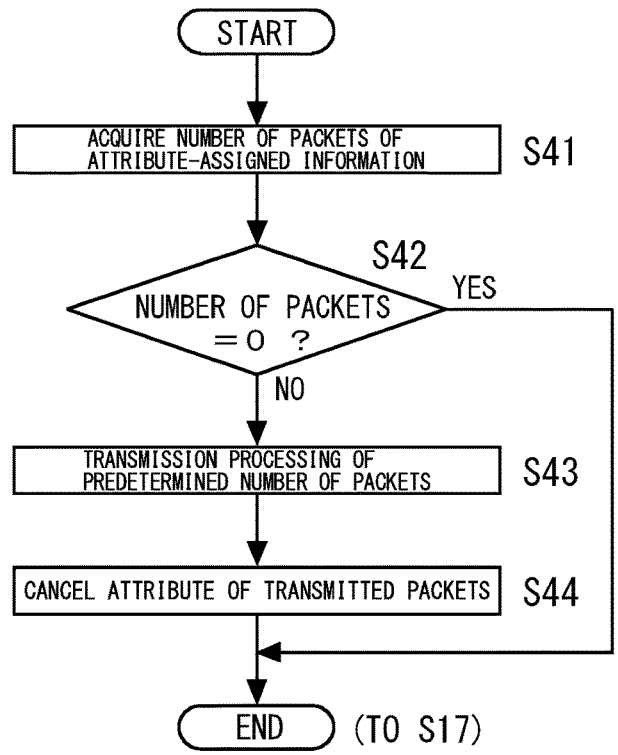
FIG. 8 A schematic flowchart showing details of a transmission processing of attribute-assigned information in FIG. 5.

Next, the CPU 21 performs a processing of transmitting the attribute-assigned information (step S16). FIG. 8 is a schematic flowchart showing the details of the transmission processing of the attribute-assigned information (step S16) in FIG. 5.

When the transmission processing of the attribute-assigned information (step S16) is started, the CPU 21 first acquires the number of packets in the attribute-assigned information storage area (step S41), and determines whether or not the number of packets is 0 (step S42).

When it is determined in step S42 that the number of packets is 0 (that is, there is no packet in the attribute-assigned information storage area), the transmission processing of the attribute-assigned information (step S16) ends, and the process proceeds to step S17 in FIG. 5. On the other hand, when it is determined in step S42 that the number of packets is not 0 (that is, there is any packet in the attribute-assigned information storage area), the process proceeds to step S43.

In step S43, when the number of packets in the attribute-assigned information storage area is equal to or larger than a predetermined number, the CPU 21 controls the communication section 26 so that the predetermined number of packets among the packets in the attribute-assigned information storage area are sequentially transmitted at predetermined time intervals. When the number of packets in the attribute-assigned information storage area is smaller than the predetermined number, the CPU 21 controls the communication section 26 so that all the packets in the attribute-assigned information storage area are sequentially transmitted at the predetermined time intervals. The packet transmission in step S15 and the packet transmission in step S16 are completed by the start timing of the next periodic processing.

Subsequently, the CPU 21 cancels the attribute assigned to the transmitted packet by deleting the packet transmitted in step S43 from the attribute-assigned information storage area (step S44). After that, the transmission processing of the attribute-assigned information (step S16) ends, and the process proceeds to step S17 in FIG. 5.

Figure 9:
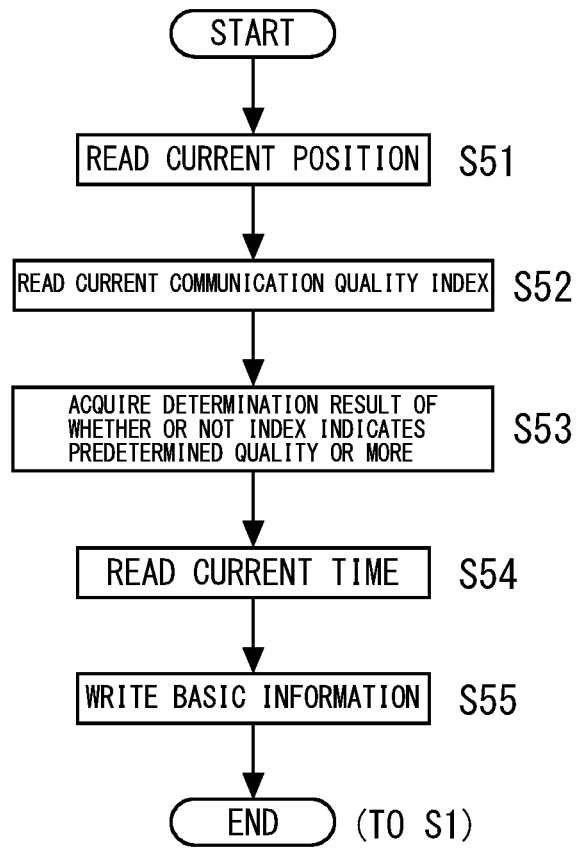
FIG. 9 A schematic flowchart showing details of a basic information collecting processing in FIG. 5.

In step S17, the CPU 21 performs a basic information collecting processing of collecting the basic information for generating or updating the zone information. FIG. 9 is a schematic flowchart showing details of the basic information collecting processing (step S17) in FIG. 5.

When the basic information collecting processing (step S17) is started, the CPU 21 first reads the current position of the railway vehicle 100 at that time (step S51), as in step S21.

Next, the CPU 21 reads an index indicating the current quality of the wireless communication at that time (step S52), as in step S31, determines by the method as described above whether or not the index indicates that the quality is equal to or higher than the predetermined quality, and acquires the determination result (step S53).

Subsequently, the CPU 21 reads the current time at that time from the clock section 25 (step S54).

After that, the CPU 21 associates the current position read in step S51, the current index read in step S52, the determination result acquired in step S53, and the current time read in step S54 with each other, and writes the associated information in the basic information storage section 27c as the basic information (step S55).

The current position read in the immediately preceding step S21 may be used as the basic information, instead of the current position read in step S51, without performing step S51. When steps S31 and S32 have already been performed in the same periodic processing (step S4), the current index and the determination result obtained in steps S31 and S32 may be used as the basic information, instead of the current indices and the determination results obtained in steps S52 and S53, without performing steps S52 and S53. Further, the current time read in the immediately preceding step S1 may be used as the basic information without performing step S54.

When step S55 ends, the basic information collecting processing (step S17) ends, and thus the periodic processing (step S4) ends and the process returns to step S1 in FIG. 4.

For example, when the railway vehicle 100 returns to the base, by connecting a personal computer or the like to the input/output interface 24, the basic information written in the basic information storage section 27c in step S55 can be read from the basic information storage section 27c by the personal computer or the like. The zone information can be generated or updated by using the basic information.

In the present embodiment, steps S11 to S14 correspond to an operation mode determining section that periodically determines, based on the current position and the zone information, whether the operation mode relating to the transmission from the communication section 26 to the base station 13a is determined to be the first operation mode or the second operation mode, wherein the operation mode determining section determines the first operation mode when the current position is within the predetermined zone 203 and determines the second operation mode based on a necessary condition that the current position is outside the predetermined zone 203. In the present embodiment, step S18 corresponds to the processing in the first operation mode, and steps S15 and S16 correspond to the processing in the second operation mode.

In the present embodiment, step S18 corresponds to an attribute assigning section that, when the operation mode determining section determines the first operation mode, assigns an attribute, indicating that new information should be transmitted later, to the new information that is not yet targeted for processing in the first operation mode or for processing in the second operation mode among the information collected in time series in the railway vehicle 100. In the present embodiment, steps S15 and S16 (excluding step S44) correspond to a communication control section that, when the operation mode determining section determines the second operation mode, controls the communication section 26 so that the new information, which is not yet targeted for processing in the first operation mode or for processing in the second operation mode among the information collected in time series in the railway vehicle 100, and at least a part of the information to which the attribute is assigned are transmitted to the base station. Further, in the present embodiment, step S44 corresponds to an attribute canceling section that cancels the attribute, which is assigned to the at least part among the information to which the attribute is assigned, after the transmission of the information.

According to the present embodiment, the information collected in time series in the railway vehicle 100 is transmitted by wireless communication to the base station 13a on the ground side by the communication section 26. Therefore, according to the present embodiment, the information collected in time series in the railway vehicle 100 can be delivered to the base station 13a on the ground side (in turn, the server 14 of the monitoring center connected to the base station 13a via the network) in a state in which real-time performance is high. As a result, the monitoring center can quickly grasp the state of the railway vehicle 100 and promptly take the countermeasure according to the state.

In the present embodiment, in steps S11 to S14, which of the first operation mode and the second operation mode is to be determined is periodically determined based on the current position and the zone information. When the current position is within the predetermined zone 203, the operation mode is determined to be the first operation mode. The operation mode is determined to be the second operation mode based on the necessary condition that the current position is outside the predetermined zone 203. When the operation mode is determined to be the first operation mode, the attribute, indicating that new information should be transmitted later, is assigned to the new information that has not yet been targeted for processing in the first operation mode or for processing in the second operation mode among the information collected in time series in the railway vehicle 100 (step S18). When the operation mode is determined to be the second operation mode, the new information, which has not yet been targeted for processing in the first operation mode or for processing in the second operation mode among the information collected in time series in the railway vehicle 100, and at least a part of the information to which the attribute is assigned are transmitted to the base station (steps S15 and S16).

Thus, according to the present embodiment, basically, when the current position of the railway vehicle 100 is within the predetermined zone 203, the attribute is assigned to the new information at that time. Basically, when the current position of the railway vehicle 100 is outside the predetermined zone, the new information at that time and the information to which the attribute is assigned are transmitted. Thus, most of such situations are prevented that the transmission is performed even though the wireless communication cannot be actually performed and even retransmission is not performed by assuming that the transmission was completed properly. As a result, the information collected in time series in the railway vehicle 100 can be delivered to the base station 13a by the wireless communication in a state where the omission of information is reduced. Not only that, according to the present embodiment, basically, when the current position of the railway vehicle 100 is outside the predetermined zone 203, at least the new information at that time is transmitted (step S15). Thus, since new information having relatively high value is sent in preference to old information having relatively low value, the information collected in time series in the railway vehicle 100 can be delivered to the base station by the wireless communication in a state in which real-time performance is higher.

According to the present embodiment, since no information is transmitted when the operation mode is determined to be the first operation mode (YES in step S12 and NO in step S14), it is often possible to avoid a useless transmission operation by the communication section 26. However, in the present invention, the information may be transmitted even when the operation mode is determined to be the first operation mode.

Further, according to the present embodiment, since the basic information for generating or updating the zone information is collected in step S17, the basic information can be easily collected. Moreover, since the basic information can be collected by the railway vehicle 100 that is actually moving, the accuracy of the zone information can be increased by generating or updating the zone information based on the basic information.

Furthermore, according to the present embodiment, the information collected in time series in the railway vehicle 100 is readably stored and retained in the collected information storage section 27b regardless of whether the information was transmitted or not. Thus, since the information collected in time series is entirely stored in the collected information storage section 27b, the failure state and the like of the railway vehicle 100 can be analyzed in detail, for example, by reading the information at the base or the like of the railway vehicle 100. However, the information which has been transmitted in steps S15 and S16 among the information recorded in the collected information storage section 27b may be deleted from the collected information storage section 27b. In this case, the storage capacity of the collected information storage section 27b can be suppressed.

Second Embodiment

Figure 10:
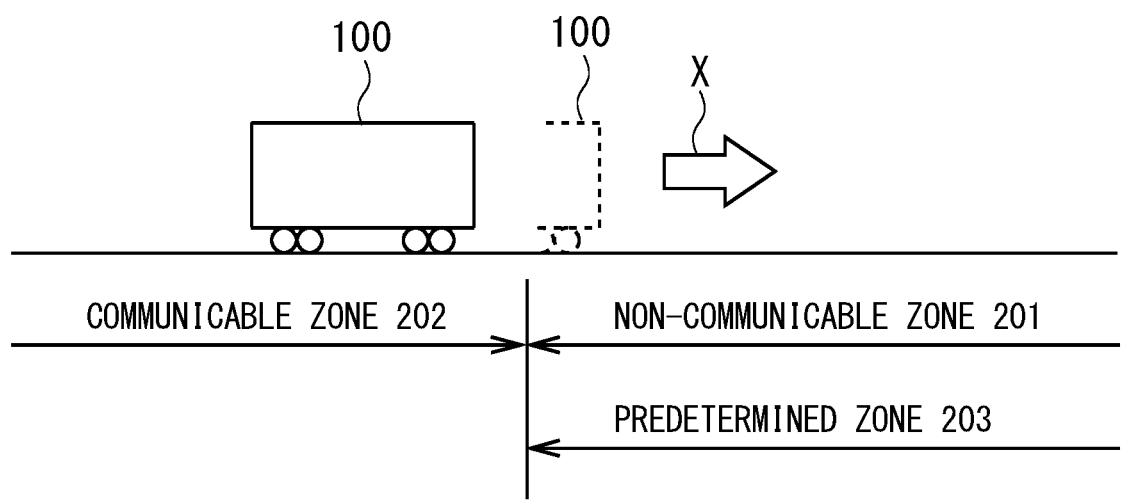
FIG. 10 A diagram schematically showing an example of a current position and a future position of the railway vehicle in association with the predetermined zone indicated by the zone information used in the information transmission device of the moving body monitoring system according to the first embodiment of the present invention.

FIG. 10 is a diagram schematically showing an example of a current position and a future position of the railway vehicle 100 in association with the predetermined zone 203 indicated by the zone information used in the information transmission device 12 of the moving body monitoring system 1 according to the first embodiment.

In FIG. 10, the railway vehicle 100 at the current position is indicated by a solid line, and the railway vehicle 100 at the future position is indicated by a broken line. X in FIG. 10 is the traveling direction of the railway vehicle 100. FIG. 10 shows not only the predetermined zone 203 but also the non-communicable zone 201 and the communicable zone 202. As described above, in the first embodiment, the predetermined zone 203 is set to be the same as the non-communicable zone 201. In FIG. 10, the railway vehicle 100 is currently located in the communicable zone 202 on the near side of the non-communicable zone 201, but is located close to the non-communicable zone 201. As indicated by the broken line, the railway vehicle 100 enters the non-communicable zone 201 in the near future. In such a case, in the first embodiment, even if it is determined at present to be NO in step S12 and YES in step S14 and the operation mode is determined to be the second operation mode, the railway vehicle 100 enters the non-communicable zone 201 at the time of actual transmission in steps S15 and S16. Thus, the wireless communication cannot be performed between the communication section 26 and the base station 13a, and the information to be delivered is omitted.

On the other hand, the information transmission device of the moving body monitoring system according to the second embodiment of the present invention can reduce or prevent such omission of information.

Figure 11:
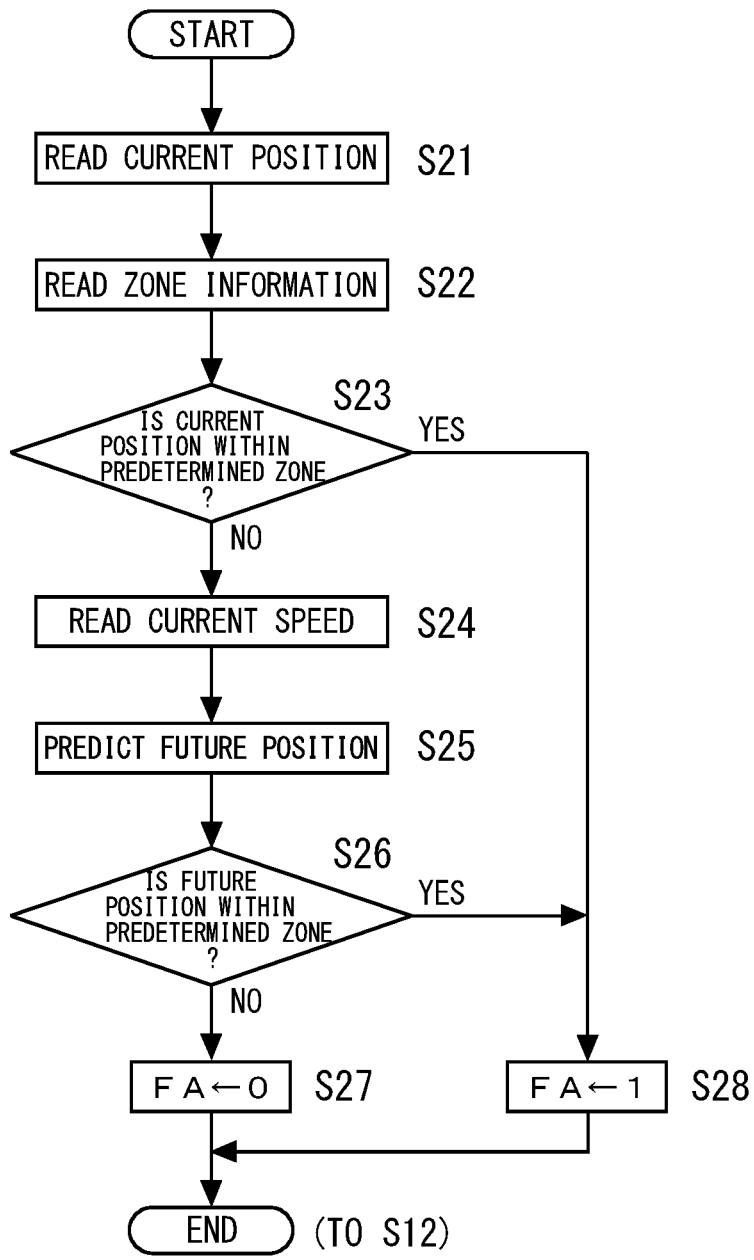
FIG. 11 A schematic flowchart showing details of a determination processing based on the zone information in FIG. 5 in an information transmission device of a moving body monitoring system according to a second embodiment of the present invention.

The difference between the second embodiment and the first embodiment of the present invention is only that in the first embodiment, the processing content of the determination processing (step S11) based on the zone information in FIG. 5 is the processing content shown in FIG. 6, whilst in the present embodiment, the processing content of the determination processing (step S11) based on the zone information in FIG. 5 is processing content shown in FIG. 11.

FIG. 11 is a schematic flowchart showing details of a determination processing based on the zone information in FIG. 5 in an information transmission device of the moving body monitoring system according to the second embodiment of the present invention, and corresponds to FIG. 6.

The processing content shown in FIG. 11 differs from the processing content shown in FIG. 6 only in that, in FIG. 11, steps S24 to S26 are added to FIG. 6.

In FIG. 11, when it is determined to be NO in step S23, the CPU 21 reads the current speed of the railway vehicle 100 from the monitoring device 11 (or directly from a vehicle speed sensor) (step S24), predicts the position (future position) of the railway vehicle 100 after a lapse of a predetermined time (for example, 10 seconds) from the current time based on the speed (step S25), and determines whether or not the predicted future position is within the predetermined zone 203 (step S26). The CPU 21 proceeds to step S28 when the determination result is YES, and proceeds to step S27 when the determination result is NO.

Therefore, in the present embodiment, even if the railway vehicle 100 is currently located in the communicable zone 202, if the predicted position after the elapse of the predetermined time enters the non-communicable zone 201, the processing is performed in the same manner as when the railway vehicle is currently in the non-communicable zone 201. Thus, according to the present embodiment, in the state as shown in FIG. 10, since the determination in step S26 is YES in FIG. 11, the omission of delivered information is reduced or prevented.

Except for the above point, the present embodiment can also obtain the same advantages as those of the first embodiment.

Third Embodiment

Figure 12:
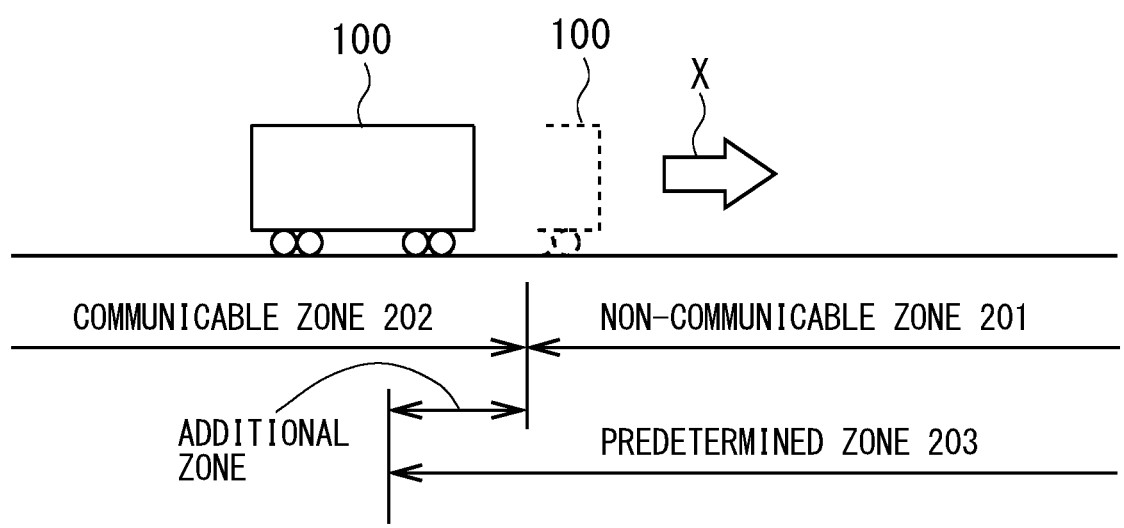
FIG. 12 A diagram schematically showing an example of a current position and a future position of a railway vehicle in association with a predetermined zone indicated by zone information used in an information transmission device of a moving body monitoring system according to a third embodiment of the present invention.

FIG. 12 is a diagram schematically showing an example of a current position and a future position of the railway vehicle 100 in association with the predetermined zone 203 indicated by the zone information used in an information transmission device of a moving body monitoring system according to a third embodiment of the present invention, and corresponds to FIG. 10.

Also in the present embodiment, like the second embodiment, it is possible to reduce or prevent the omission of information that occurs in the first embodiment.

The difference between the present embodiment and the first embodiment is only that in the first embodiment, the predetermined zone 203 is set to be the same as the non-communicable zone 201, whilst in the present embodiment, the predetermined zone 203 includes, in addition to the non-communicable zone 201, a zone which is located on the near side of the non-communicable zone 201 in the traveling direction X of the railway vehicle 100, in which the wireless communication can be performed ("additional zone" in FIG. 12), and which has a predetermined distance in the traveling direction X ("additional zone" in FIG. 12). In the present embodiment, more specifically, the predetermined zone 203 is a zone obtained by adding the additional zone to the non-communicable zone 201.

In the present embodiment, unlike the second embodiment, the processing content of the determination processing based on the zone information in FIG. 5 is left as the processing content shown in FIG. 6 as in the first embodiment.

According to the present embodiment, in the case as shown in FIG. 12, since the railway vehicle 100 is currently located in the communicable zone 202 but is located in the predetermined zone 203, the same processing as when the railway vehicle is currently in the non-communicable zone 201 is performed. Therefore, according to the present embodiment, the omission of information that occurs in the first embodiment is reduced or prevented, as in the second embodiment.

Except for the above point, the present embodiment can also obtain the same advantages as those of the first embodiment.

Fourth Embodiment

Figure 13:
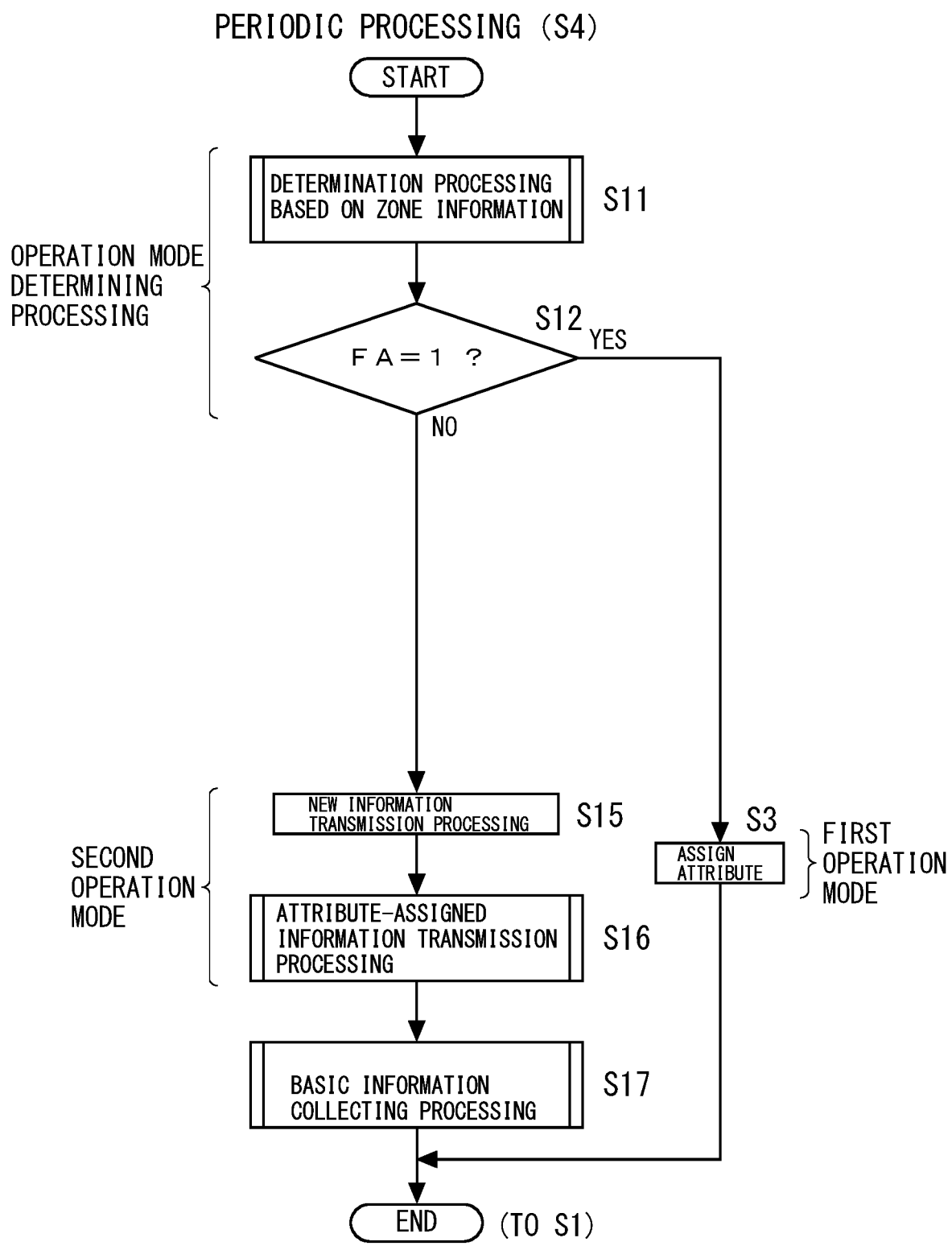
FIG. 13 A schematic flowchart showing details of the periodic processing in FIG. 4 in an information transmission device of a moving body monitoring system according to a fourth embodiment of the present invention.

FIG. 13 is a schematic flowchart showing details of periodic processing (step S4) in FIG. 4 in an information transmission device of an moving body monitoring system according to a fourth embodiment of the present invention, and corresponds to FIG. 5.

The difference between the present embodiment and the first embodiment is only that in the first embodiment, the processing content of the periodic processing (step S4) in FIG. 4 is the processing content shown in FIG. 5, whilst in the present embodiment, the processing content of the periodic processing (step S4) in FIG. 4 is processing content shown in FIG. 13.

The processing content shown in FIG. 13 differs from the processing content shown in FIG. 5 only in that, in FIG. 13, steps S13 and S14 are removed, and the process proceeds to step S15 when the determination in step S12 is NO.

Also according to the present embodiment, substantially the same advantages as those of the first embodiment can be obtained.

In the present invention, the same modification as that added to the first embodiment when obtaining the second embodiment or the same modification as that added to the first embodiment when obtaining the third embodiment may be applied to the fourth embodiment.

Fifth Embodiment

FIG. 14 is a schematic flowchart showing details of a periodic processing (step S4) in FIG. 4 in an information transmission device of a moving body monitoring system according to a fifth embodiment of the present invention, and corresponds to FIG. 5.

The difference between the present embodiment and the first embodiment is only that in the first embodiment, the processing content of the periodic processing (step S4) in FIG. 4 is the processing content shown in FIG. 5, whilst in the present embodiment, the processing content of the periodic processing (step S4) in FIG. 4 is processing content shown in FIG. 14.

The processing content shown in FIG. 14 differs from the processing content shown in FIG. 5 only in that, in FIG. 14, steps S11 and S12 are removed, and when the periodic processing (step S4) in FIG. 4 is started, step S13 is immediately performed.

In the present embodiment, the zone information storage section 27a, the basic information storage section 27c, and the basic information collecting processing (step S17) in FIG. 5 may be removed.

Also according to the present embodiment, substantially the same advantages as those of the first embodiment can be obtained.

Sixth Embodiment

In the fifth embodiment, in the state as shown in FIG. 10, as in the case of the first embodiment, the omission of information to be delivered occurs.

The information transmission device of the moving body monitoring system according to the sixth embodiment of the present invention can reduce or prevent such omission of information.

the present embodiment is different from the fifth embodiment only in the point described below.

In the fifth embodiment, similarly to the first embodiment, in step S18, the CPU 21 assigns the attribute, indicating that information should be transmitted later, to the information read in the immediately preceding step S3 (new information that has not yet been targeted for processing in step S18 or for processing in step S15 or later among the information collected by the monitoring device 11 in time series in the railway vehicle 100). On the other hand, in the present embodiment, the attribute is assigned not only to the new information but also to information (this information is stored in the collected information storage section 27b) collected from N (N is an integer of 1 or more) times before to one time before the new information among the information collected in time series by the monitor device 11 in the railway vehicle 100. Specifically, in the present embodiment, the CPU 21 reads the information collected from N (N is an integer of 1 or more) times before to one time before from the collected information storage section 27b, generates a plurality of packets from the read information, and also stores the plurality of packets in the attribute-assigned information storage area, thereby assigning the attribute.

According to the present embodiment, as shown in FIG. 10, even when such a situation occurs that, in the case where the railroad vehicle 100 is located on the near side of the non-communicable zone 202 but close to the zone, the railroad vehicle 100 has entered the non-communicable zone 201 at the time of actual transmission and cannot perform the wireless communication, the information that could not be transmitted at that time (the information collected from N times before to one time before) will be retransmitted. As a result, it is possible to reduce or prevent the omission of information to be delivered.

Although the individual embodiments of the present invention have been described above, the present invention is not limited to these embodiments.

For example, in the first to fourth embodiments, the predetermined zone 203 may be extended from the non-communicable zone 201 to the rear side in the traveling direction X of the railway vehicle 100 by a predetermined distance.

Further, in each of the above-described embodiments, the moving body is the railway vehicle 100, but the moving body is not limited to the railway vehicle 100 in the present invention.

REFERENCE SIGNS LIST 1 moving body monitoring system
11 monitoring device
12 information transmission device
26 communication section
26a index acquisition section
27a zone information storage section
27b collected information storage section
27c basic information storage section
100 railway vehicle

The invention claimed is:
1. An information transmission device installed in a moving body, comprising:
a communication section that performs wireless communication with a base station on a ground side;

a position detection section that detects current position of the moving body;

a zone information storage section that stores zone information indicating a predetermined zone that includes a zone in which the wireless communication cannot be performed;

an operation mode determining section that periodically determines, based on the current position and the zone information, whether an operation mode relating to transmission from the communication section to the base station is to be a first operation mode or a second operation mode, wherein the operation mode determining section determines the first operation mode when the current position is within the predetermined zone and determines the second operation mode based on a necessary condition that the current position is outside the predetermined zone;

an attribute assigning section that, when the operation mode determining section determines the first operation mode, assigns an attribute, indicating that new information should be transmitted later, to the new information that is not yet targeted for processing in the first operation mode or for processing in the second operation mode among information collected in time series in the moving body;

a communication control section that, when the operation mode determining section determines the second operation mode, controls the communication section so that the new information, which is not yet targeted for processing in the first operation mode or for processing in the second operation mode among the information collected in time series, and at least a part of the information to which the attribute is assigned are transmitted to the base station; and an attribute canceling section that cancels the attribute, which is assigned to the at least part among the information to which the attribute is assigned, after the transmission of the information.

2. The information transmission device in the moving body according to claim 1, wherein
the operation mode determining section determines the first operation mode when predicted future position of the moving body after lapse of a predetermined time from current time is within the predetermined zone.

3. The information transmission device in the moving body according to claim 1, wherein
the predetermined zone includes a zone in which the wireless communication can be performed, which is located in a traveling direction of the moving body on a near side of the zone where the wireless communication cannot be performed, and which has a predetermined distance in the traveling direction.

4. The information transmission device in the moving body according to claim 1, wherein
the communication control section controls the communication section so that the information is not transmitted when the operation mode determining section determines the first operation mode.

5. The information transmission device in the moving body according to claim 1, further comprising:
an index acquisition section that acquires an index indicating current quality of the wireless communication, wherein
the operation mode determining section determines the second operation mode based on a necessary condition that the index indicates that the quality is equal to or higher than predetermined quality.

6. The information transmission device in the moving body according to claim 5, wherein
the index is based on at least one of RSSI, SNR, noise strength, or CQI.

7. The information transmission device in the moving body according to claim 1, further comprising:
a basic information collecting section that collects basic information for generating or updating the zone information.

8. The information transmission device in the moving body according to claim 7, wherein
the basic information collecting section periodically collects, as at least a part of the basic information, an index indicating current quality of the wireless communication or a determination result of whether or not the index indicates that the quality is equal to or higher than a predetermined quality, and the current position of the moving body, in association with each other.

9. The information transmission device in the moving body according to claim 1, further comprising:
a storage section that primarily stores the information collected in time series, wherein
information transmitted when the operation mode determining section determines the second operation mode, among the information collected in time series, is deleted from the storage section.

10. The information transmission device in the moving body according to claim 1, further comprising:
a storage section that readably stores and retains the information collected in time series regardless of whether the information was transmitted or not.

11. The information transmission device in the moving body according to claim 1, wherein
the moving body is a railway vehicle.

12. A moving body monitoring system, comprising:
the information transmission device in the moving body according to claim 1; and
a server of a monitoring center that receives, via a network including the base station, the information transmitted by the information transmission device.

13. An information transmission device installed in a moving body, comprising:
a communication section that performs wireless communication with a base station on a ground side;
an index acquisition section that acquires an index indicating current quality of the wireless communication;
an operation mode determining section that periodically determines, based on the index, whether an operation mode relating to transmission from the communication section to the base station is to be a first operation mode or a second operation mode, wherein the operation mode determining section determines the first operation mode when the index indicates that the quality is lower than predetermined quality and determines the second operation mode when the index indicates that the quality is equal to or higher than the predetermined quality;
an attribute assigning section that, when the operation mode determining section determines the first operation mode, assigns an attribute, indicating that new information should be transmitted later, to the new information that is not yet targeted for processing in the first operation mode or for processing in the second operation mode among information collected in time series in the moving body;
a communication control section that, when the operation mode determining section determines the second operation mode, controls the communication section so that the new information, which is not yet targeted for processing in the first operation mode or for processing in the second operation mode among the information collected in time series, and at least a part of the information to which the attribute is assigned are transmitted to the base station; and an attribute canceling section that cancels the attribute, which is assigned to the at least part among the information to which the attribute is assigned, after the transmission of the information.

14. The information transmission device in the moving body according to claim 13, wherein
the index is based on at least one of RSSI, SNR, noise strength, or CQI.

15. The information transmission device in the moving body according to claim 13, wherein
when the operation mode determining section determines the first operation mode, the attribute assigning section assigns the attribute not only to the new information that is not yet targeted for processing in the first operation mode or for processing in the second operation mode among the information collected in time series but also to information collected from N times before to one time before the new information among the information collected in time series, where N is an integer of 1 or more.

16. The information transmission device in the moving body according to claim 13, wherein
the communication control section controls the communication section so that the information is not transmitted when the operation mode determining section determines the first operation mode.

17. The information transmission device in the moving body according to claim 13, further comprising:
a storage section that primarily stores the information collected in time series, wherein
information transmitted when the operation mode determining section determines the second operation mode, among the information collected in time series, is deleted from the storage section.

18. The information transmission device in the moving body according to claim 13, further comprising:
a storage section that readably stores and retains the information collected in time series regardless of whether the information was transmitted or not.

19. The information transmission device in the moving body according to claim 13, wherein
the moving body is a railway vehicle.

20. A moving body monitoring system, comprising:
the information transmission device in the moving body according to claim 13; and
a server of a monitoring center that receives, via a network including the base station, the information transmitted by the information transmission device.

* * * * *